United States Patent
Sonnino et al.

(10) Patent No.: US 9,801,219 B2
(45) Date of Patent: Oct. 24, 2017

(54) PAIRING OF NEARBY DEVICES USING A SYNCHRONIZED CUE SIGNAL

(71) Applicant: Microsoft Technology Licensing, LLC, Redmond, WA (US)

(72) Inventors: Roberto Sonnino, Seattle, WA (US); Jordan Mandel-Iaia, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/740,060

(22) Filed: Jun. 15, 2015

(65) Prior Publication Data
US 2016/0366713 A1 Dec. 15, 2016

(51) Int. Cl.
| | | |
|---|---|---|
| H04B 7/00 | (2006.01) |
| H04W 76/02 | (2009.01) |
| G09G 5/12 | (2006.01) |
| G06F 3/16 | (2006.01) |
| G09G 3/00 | (2006.01) |
| H04W 4/00 | (2009.01) |

(Continued)

(52) U.S. Cl.
CPC .......... *H04W 76/023* (2013.01); *G06F 3/167* (2013.01); *G09G 3/002* (2013.01); *G09G 5/12* (2013.01); *H04W 4/008* (2013.01); *H04W 12/06* (2013.01); *H04W 4/005* (2013.01); *H04W 12/04* (2013.01)

(58) Field of Classification Search
CPC ............ H04L 63/0492; H04L 63/0869; H04M 1/7253; H04W 12/06
USPC ........................................ 455/41.2
See application file for complete search history.

(56) References Cited

U.S. PATENT DOCUMENTS

| | | |
|---|---|---|
| 7,224,981 B2 | 5/2007 | Deisher et al. |
| 8,306,193 B2 | 11/2012 | Harwood et al. |
| 8,340,975 B1 | 12/2012 | Rosenberger |

(Continued)

FOREIGN PATENT DOCUMENTS

| | | |
|---|---|---|
| EP | 2 683 147 A1 | 1/2014 |
| WO | WO2009/014438 | 1/2009 |

(Continued)

OTHER PUBLICATIONS

"BlueGenie™ Voice Interface for Bluetooth® Mono and Stereo Headsets, and now Hands-Free Car Kits", Published on: Apr. 20, 2010, Available at: http://www.sensoryinc.com/products/bluetooth_solutions.html.

(Continued)

*Primary Examiner* — Xin Jia
(74) *Attorney, Agent, or Firm* — Klarquist Sparkman, LLP

(57) ABSTRACT

A method for pairing devices in a communication network using a cue signal may include receiving by a first computing device in a communication network, a cue signal. The cue signal is matched with a pre-determined cue signal. A listening window can be opened upon successful matching of the received cue signal with a pre-determined signal. A device identifier broadcast associated with a second computing device within the communication network may be detected during the listening window. The device identifier may be broadcast in response to the cue signal. Pairing may be initiated with the second computing device. The listening window may be of a fixed duration, and the device identifier may be detected prior to expiration of the fixed duration.

20 Claims, 10 Drawing Sheets

(51) Int. Cl.
*H04W 12/06* (2009.01)
*H04W 12/04* (2009.01)

(56) References Cited

U.S. PATENT DOCUMENTS

| | | | |
|---|---|---|---|
| 8,612,036 B2 | 12/2013 | Yamamura | |
| 2005/0010417 A1 | 1/2005 | Holmes | |
| 2010/0330909 A1 | 12/2010 | Maddern et al. | |
| 2012/0244810 A1* | 9/2012 | Klos | H04L 63/0492 |
| | | | 455/41.2 |
| 2013/0242706 A1 | 9/2013 | Newsome, Jr. | |
| 2014/0046664 A1* | 2/2014 | Sarkar | H04W 12/06 |
| | | | 704/246 |
| 2014/0235171 A1 | 8/2014 | Molettiere et al. | |
| 2015/0026580 A1* | 1/2015 | Kang | G06F 3/167 |
| | | | 715/728 |
| 2015/0381594 A1* | 12/2015 | Venkatesan | H04L 63/08 |
| | | | 726/6 |

FOREIGN PATENT DOCUMENTS

| | | |
|---|---|---|
| WO | WO 2014/064324 | 5/2014 |
| WO | WO 2014/109710 | 7/2014 |

OTHER PUBLICATIONS

International Preliminary Report on Patentability, International Application No. PCT/US2016/035954, 7 pages, dated May 22, 2017.
International Search Report and Written Opinion for PCT/US2016/035954, dated Aug. 19, 2016, 11 pages.

* cited by examiner

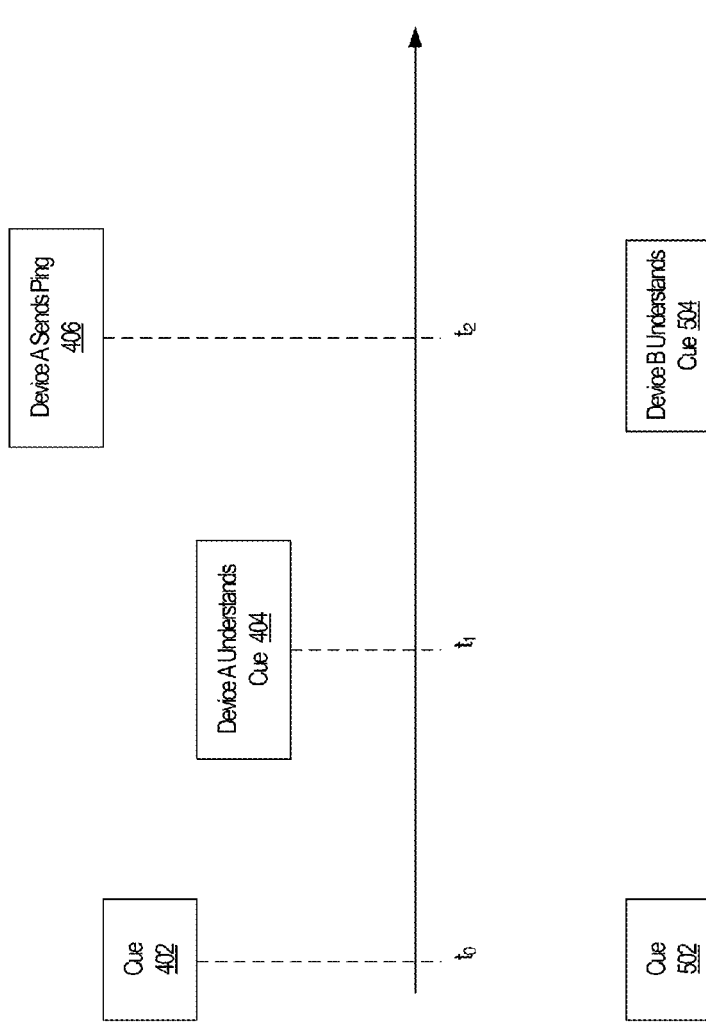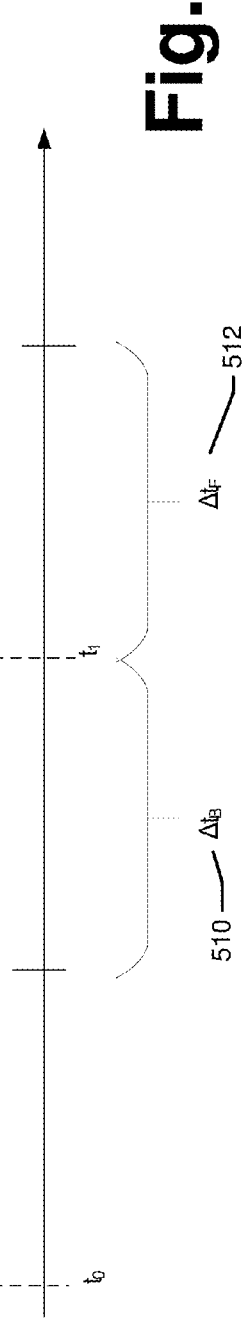

PAIRING OF NEARBY DEVICES USING A SYNCHRONIZED CUE SIGNAL

BACKGROUND

As computing technology has advanced, increasingly powerful mobile devices have become available. For example, smart phones have become commonplace. The mobility of such devices has resulted in different types of functionality being developed, such as functionality enabling interaction between devices and/or applications.

At least some time spent on mobile devices is spent using applications (or "apps"). Some known applications are isolated programs that display content as a set of pages that a user can interact with and navigate between. The functionality of at least some known applications is limited to displaying content expressly requested by the user, and the functionality provided by the application may be, for example, associated with work and/or personal tasks.

As new and more sophisticated devices and applications are developed, the need to perform tasks in applications across multiple devices has become more and more common, but getting them connected quickly can be cumbersome.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a computing device may include a processing unit (e.g., 124) and a memory (e.g., 128). The processing unit may be configured to detect a cue signal, which may be matched with a pre-determined cue signal. Upon successful matching of the cue signal, the processing unit may enable broadcasting during a listening window, a device identifier associated with the computing device. The processing unit may also initiate pairing with a second computing device receiving the broadcast device identifier, where the listening window is activated based on the cue signal.

In accordance with one or more aspects, a method for pairing devices in a communication network using a cue signal may include receiving by a first computing device in a communication network, a cue signal. The cue signal is matched with a pre-determined cue signal. A listening window can be opened upon successful matching of the received cue signal with a pre-determined signal. A device identifier broadcast associated with a second computing device within the communication network may be detected during the listening window. The device identifier may be broadcast in response to the cue signal. Pairing may be initiated with the second computing device.

In accordance with one or more aspects, a computer-readable storage medium may store computer-executable instructions for causing a computing device to perform operations for pairing devices in a communication network using a cue signal. The stored instructions may include instructions to detect whether at least another computing device is available for communication via a first communication protocol. The instructions may further include instructions to receive a cue signal upon determining that the at least another computing device comprises a plurality of other computing devices available for communication via the first communication protocol. The instructions may further include instructions to match the cue signal with a pre-determined cue signal. Upon successful matching of the cue signal, a device identifier associated with the computing device may be broadcast. The broadcast may be initiated during a listening window and using a second communication protocol. Pairing may be initiated with one of the plurality of other computing devices receiving the broadcast device identifier, where the listening window is activated based on the cue signal.

As described herein, a variety of other features and advantages can be incorporated into the technologies as desired.

BRIEF DESCRIPTION OF THE DRAWINGS

FIG. 4 is an example timing diagram for a computing device receiving a cue signal and sending a cue, without initiating pairing with another device.

FIG. 5 is an example timing diagram for a computing device receiving a cue signal and opening a listening window, without initiating pairing with another device.

DETAILED DESCRIPTION

One or more of the following mechanisms may be used for pairing: (1) sending a broadcasted request and waiting for answers from available devices (e.g., UDP Multicast over TCP/IP or Bluetooth); (2) direct address (inputting the address of the target device by, e.g., typing a URL or an IP address); and (3) using centralized lists of device addresses that are available to the user (e.g., by using a directory service). However, using the above methods may be time consuming as they might involve long search times, complicated disambiguation user interface (UI) with long lists of results, or simply difficulty in finding a device.

In accordance with techniques described herein, a device pairing service may be used to provide device finding and pairing functionalities allowing two or more devices to establish communication with minimal user interruption. More specifically, a cue signal (which may be broadcast as, e.g., digital voice input signal) is received by at least two computing devices. The device pairing service of the first computing device can match the cue signal with a pre-determined signal. Upon successful matching, the first device may broadcast a device identifier ("ID"). Upon detecting the cue, the second (receiving) device may open a listening window, and may receive the device ID from the first device during the listening window. If other device IDs are received during the listening window, a disambiguation process may be initiated to select a single device ID and connect with the corresponding device associated with the device ID. The disambiguation may be performed by sending a voice fingerprint of the cue signal along with the device ID, and the receiving device may match the received voice fingerprint with a fingerprint of the cue signal received at the receiving device Once paired, the devices can then communicate to perform one or more tasks, such as screen sharing/duplication, screen extension, file sharing (one-way and two-way), exchanging messages, initiating and controlling content playback (e.g., videos or image slideshows), and/or remote controlling of device user interfaces.

Figure 1:
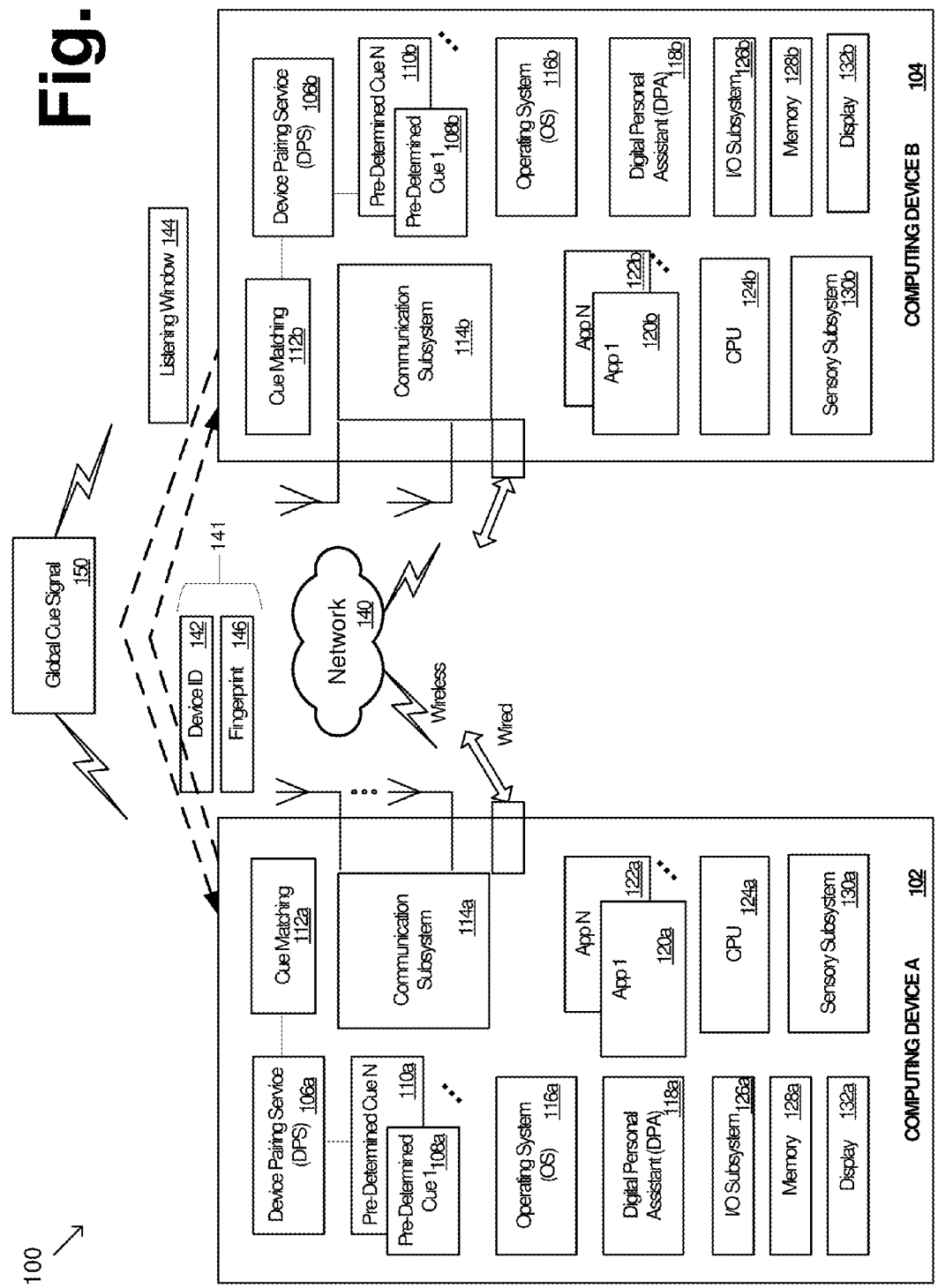
FIG. 1 is a schematic diagram illustrating an exemplary computing devices including a device pairing service in accordance with one or more embodiments.

FIG. 1 is a schematic diagram illustrating an exemplary computing devices including a device pairing service in accordance with one or more embodiments. Referring to FIG. 1, the example system 100 may comprise a first computing device 102 and a second computing device 104. The computing devices 102 and 104 may include a handset, a smartphone, a tablet, a laptop, and/or another handheld or portable device. The two computing devices may be communicatively coupled with each other via a wired and/or wireless network 140 (which may include the Internet as well as other wired/wireless networks). In some implementations, the second computing device 104 may be a computing device that is not typically portable (e.g., a desktop computer, a projector, or another computing device).

Additionally, the computing devices 102 and 104 may each comprise, for example, a main processor 124 (124a in device 102 and 124b in device 104), a system memory 128 (128a and 128b, respectively), a communication subsystem 114 (114a and 114b, respectively), a sensory subsystem 130 (130a and 130b, respectively), an input/output (I/O) subsystem 126 (126a and 126b, respectively), and displays 132 (132a and 132b, respectively).

The devices 102-104 may include any number of applications 120, . . . , 122 that enable the devices to function as described herein. For example the devices 102-104 may have first-party applications (e.g., applications native to the device) and third-party applications (e.g., applications created by third-parties such as application development companies) installed in an application space for each device. The first-party applications may include, for example, a profile manager application, contacts application, camera application, and so forth. The third-party applications may include applications, which can be social networking applications, music streaming service applications, news applications, mail applications, and so forth.

The devices 102-104 may each include a digital personal assistant (118a, 118b) (DPA), which may be implemented as a stand-alone application or as part of the operating system 116. The DPA 118 may provide digitized voice input processing functionalities, such as detecting voice input, converting the detected voice input to one or more commands for execution by the device, generating a fingerprint of the detected voice input and so forth.

The device pairing service (DPS) 106 may comprise suitable circuitry, interfaces, logic and/or code and may be operable to provide functionalities associated with pairing devices using a synchronized cue signal. As used herein, the term "synchronized cue signal" (or "global cue signal") means a signal (e.g., a voice signal, an audio signal, a light signal or any other type of signal) that is communicated and may be received by one or more computing devices that are in proximity to each other (e.g., in the same room). The DPS 106 may be configured to receive a cue signal and use the cue matching block 112 to match the cue signal with one or more of a plurality of pre-determined cue signals 108, . . . , 110. The pre-determined signals 108, . . . , 110 may be stored in the system memory 128, may be stored as part of the DPA 118, the applications 120, . . . , 122 and/or the OS 116. In example embodiment, the cue matching block 112 and the pre-determined cue signals 108, . . . , 110 may be part of the DPS 106.

Upon performing a successful match the DPS 106 (e.g., DPS 106a at device 102) may generate a ping signal 141, which may include a device identifier (ID) 142 associated with the device 102. The DPS 106a may also include additional information in the ping signal 141, such as a fingerprint 146 or other data associated with the received cue signal 150. For example, the fingerprint 146 may be an audio fingerprint of the cue signal 150 (which may be a digitized voice input/command), may include audio length for the cue signal 150, and so forth.

The DPS 106 (e.g., 106b at device 104) may be further configured to open a listening window 144 after the global cue signal 150 is received by device 104. The listening window 144 may be used for monitoring for any incoming ping signals, such as ping signal 141. If a single ping signal is received, then pairing may be automatically initiated between the sending and receiving devices. In instances when more than one ping signal is received during the listening window, then the DPS 106b may perform disambiguation so that a single ping signal may be selected and pairing with the corresponding device may be initiated.

In an example embodiment, disambiguation between different received device identifiers may be based on the time the cue signal is received and the listening window is opened. For example, after the cue 150 is received at device 104, the listening window 144 is opened where the window 144 may be of a fixed duration. In this regard, only ping signals received within the fixed duration listening window 144 may be considered (this may be referred to as a first level of disambiguation).

In instances when there are more than one ping signals received within the listening window 144, then a second level of disambiguation may be performed. The second level of disambiguation may be based on additional metadata associated with, e.g., the cue signal 150. For example, the DPS 106b may compare a fingerprint of the cue signal 150 received by the device 104 with the fingerprint 146 (of the same cue signal 150) received as part of the ping signal 141. A match between the two fingerprints may indicate that both devices 102 and 104 were in proximity to the source of the cue signal 150 (and therefore, in proximity to each other). If device 102 generated a fingerprint based on another cue signal then the fingerprint matching at device 104 will fail, indicating devices 102 and 104 are not nearby devices (e.g., in the same room) and pairing will not take place. The fingerprint signal 146 may be a hash of the audio associated with the cue signal 150, or it may be based on another type of metadata associated with the cue signal 150. In yet another example embodiment, second level of disambiguation may be performed by, e.g., displaying a list of the devices available for pairing after the first level of disambiguation (and the user may select from the list); use additional context information (e.g., device 104 may access a network calendar, determine the conference room location it is currently in, and then determine which other device (or devices) is also scheduled to be in the same conference room); and/or ignore the ping messages that have been received during the listening window 144 (a new cue message can be send and another pairing process may be initiated so that a single ping message may be received during the new listening window).

The main processor 124 may comprise suitable logic, circuitry, interfaces, and/or code that may be operable to process data, and/or control and/or manage operations of the computing device 100, and/or tasks and/or applications performed therein in connection with functionalities related to pairing of nearby devices using a cue signal. In this regard, the main processor 124 may be operable to configure and/or control operations of various components and/or subsystems of the computing device 100 by utilizing, for example, one or more control signals. The main processor 124 enables running and/or execution of applications, programs and/or code, which may be stored, for example, in the system memory 128. In some instances, one or more of the applications running and/or executing on the computing devices 102-104 (e.g., the applications 120, . . . , 122) may generate and/or update video content that may be rendered via the display 132.

The system memory 128 may comprise suitable logic, circuitry, interfaces, and/or code that may enable permanent and/or non-permanent storage, buffering, and/or fetching of data, code and/or other information, which may be used, consumed, and/or processed. In this regard, the system memory 128 may comprise different memory technologies, including, for example, read-only memory (ROM), random access memory (RAM), Flash memory, solid-state drive (SSD), and/or field-programmable gate array (FPGA). The system memory 128 may store, for example, configuration data, which may comprise parameters and/or code, comprising software and/or firmware.

The communication subsystem 114 may comprise suitable logic, circuitry, interfaces, and/or code operable to communicate data from and/or to the computing devices 102-104, such as via one or more wired and/or wireless connections. The communication subsystem 114 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing devices 102-104, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation.

The sensory subsystem 130 may comprise suitable logic, circuitry, interfaces, and/or code for obtaining and/or generating sensory information, which may relate to the computing devices 102-104, its user(s), and/or its environment. For example, the sensory subsystem 130 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 126 may comprise suitable logic, circuitry, interfaces, and/or code for enabling user interactions with the device 100, enabling obtaining input from user(s) and/or to providing output to the user(s). The I/O subsystem 126 may support various types of inputs and/or outputs, including, for example, video, audio, and/or textual.

In this regard, dedicated I/O devices and/or components, external to or integrated within the computing devices 102-104, may be utilized for inputting and/or outputting data during operations of the I/O subsystem 126. Exemplary I/O devices may comprise one or more built-in cameras (e.g., front-facing and/or rear-facing camera), one or more displays (e.g., display 132), mice, keyboards, touchscreens, voice input interfaces, and other input/output interfaces or devices. With respect to video outputs, the I/O subsystem 126 may be operable to generate and/or process video content, graphics, and/or textual data, and/or generate video frames based thereon for display, via the display 132 for example.

The display 132 may comprise suitable logic, circuitry, interfaces and/or code that may enable displaying of video content, which may be handled and/or processed via the I/O subsystem 126.

The devices 102-104 may further include tangible storage (not illustrated in FIG. 1), which may be removable or non-removable, and includes magnetic disks, magnetic tapes or cassettes, CD-ROMs, DVDs, or any other medium which can be used to store information and which can be accessed within the computing devices 102-104. The storage can store one or more instructions for the device pairing service 106, implementing one or more innovations described herein.

In operation, computing device 102 (or "device A") is capable of broadcasting messages, and computing device 104 (or "device B"), is capable of receiving broadcasted messages from devices such as device A (e.g., via UDP Multicast communications). Device B is capable of pairing with another device given a device identifier (e.g., an IP address or host-name). Device A is capable of providing such an identifier, identifying itself. Additionally, Device B will be able to be paired while listening for broadcasted identifiers.

Both devices A and B are configured to recognize a mutually agreed upon cue signal, external to the broadcast channel for communication between the devices. For example, the global cue signal may be a voice signal and both devices may use speech recognition to listen for a known keyword phrase (e.g., one of the pre-determined cue signals 108, . . . , 110). As an example, device A may be a smart phone and device B may be a smart projecting device, both capable of voice recognition. The user of device A may enter a conference room with device B installed inside the conference room, and the user may say "Project my screen," which is the global cue signal 150 that is received by both devices A and B.

Figure 2:
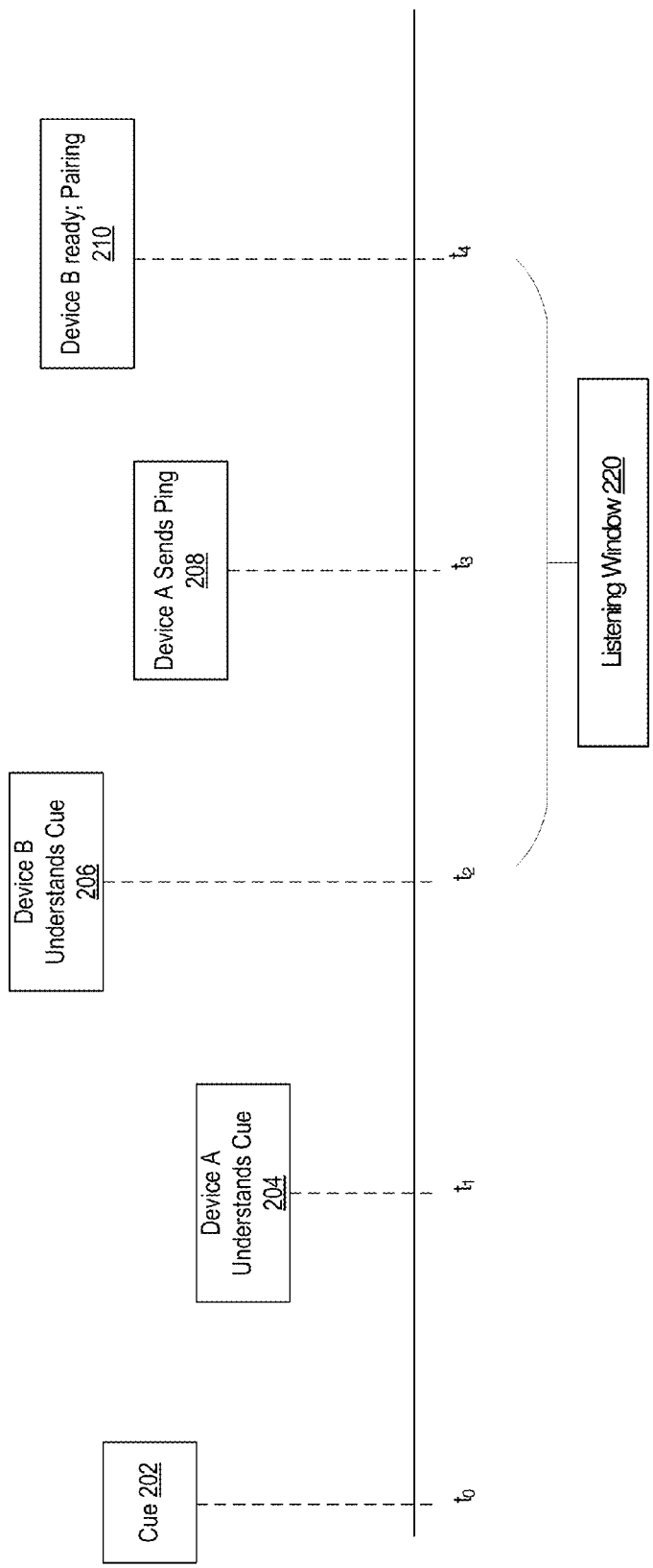
FIG. 2 is an example timing diagram of using a cue signal to send a ping signal during a listening window, in accordance with one or more embodiments.

FIG. 2 is an example timing diagram of using a cue signal to send a ping signal during a listening window, in accordance with one or more embodiments. Referring to FIGS. 1-2, the cue signal 202 (or 150) is generated/broadcast at time t0. Both devices A and B are actively waiting for the cue, and the cue signal is recognized/understood by both devices at 204 (time t1) and 206 (time t2). After device B recognizes the cue at t2, device B opens a listening window 220 and begins accepting incoming broadcasted device identifiers, for a limited time (e.g., from t2 until t4), to initiate pairing. When the cue signal 202 is recognized by device A, then device A broadcasts (at 208 or time t3) its own unique device identifier (e.g., ping signal 141). The combination of device A broadcasting a ping signal and device B listening within a listening window (e.g., of a fixed or pre-determined duration), when the cue is recognized by both, pairing can be initiated automatically (e.g., from device B to device A, at 210 or time t4).

Figure 3:
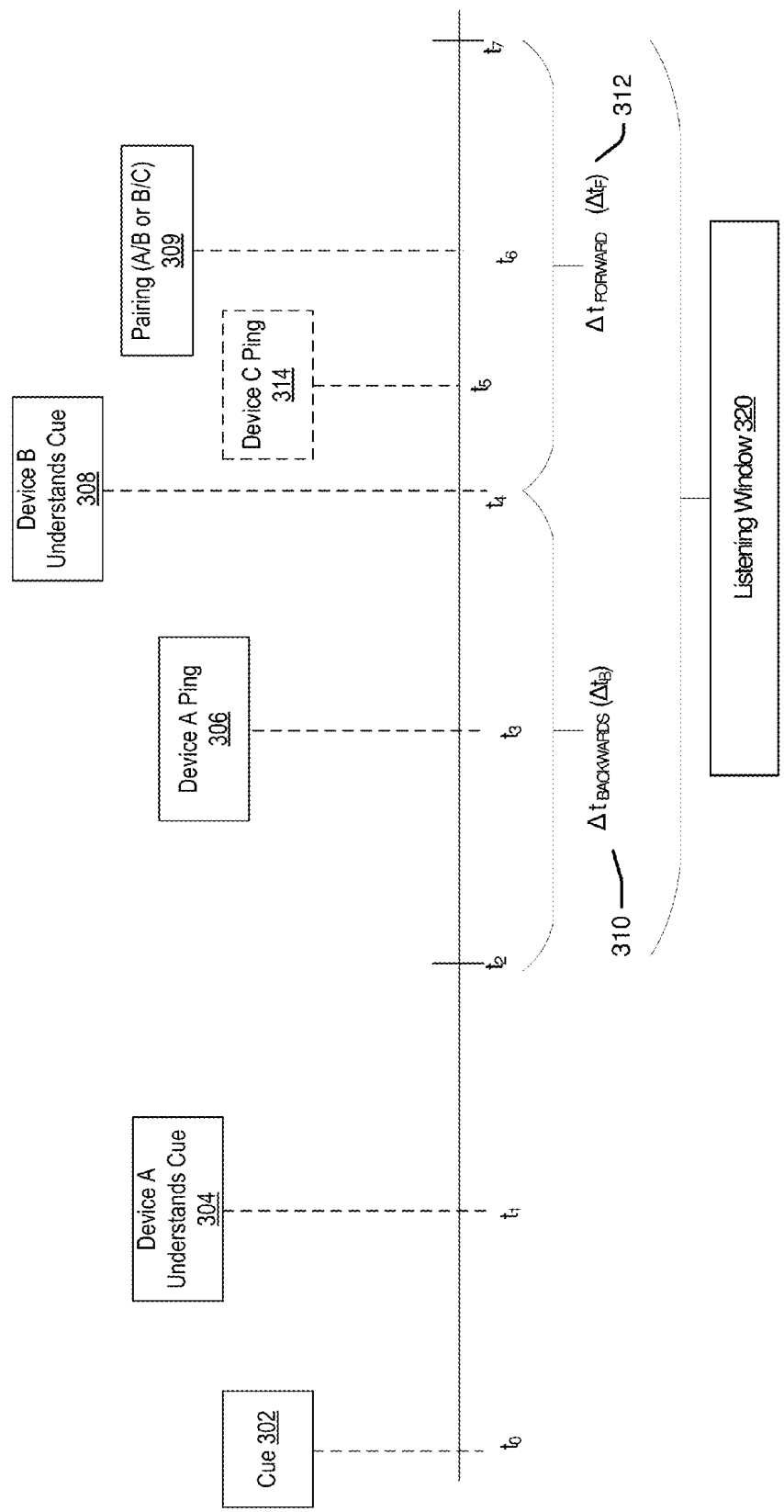
FIG. 3 is an example timing diagram where a first device sends a ping prior to a second device opening a listening window, in accordance with one or more embodiments.

FIG. 3 is an example timing diagram where a first device sends a ping prior to a second device opening a listening window, in accordance with one or more embodiments. Referring to FIG. 3, there is illustrated an example processing scenario when the ping signal sent from device A is not received within the listening window of device B. More specifically, the cue signal 302 is broadcast at time t0. Device A understands the cue at 304 (or time t1), and sends a ping signal at 306 (or time t3). Device B understands the cue signal at 308 (or time t4), after the ping signal of device A is sent at time t3.

In accordance with one or more embodiments and for additional robustness, device B can store received messages (including ping signals), and upon recognizing the cue, device B can "look back" for messages (or ping signals) that may have been received in the recent past. For example, after device B understands the cue at time t4, a listening window is opened (e.g., from time t4 till time t7, or $\Delta t_{Forward}$ 312). However, device B also "looks back" in time (e.g., from time t4 back to time t2, indicated as $\Delta t_{Backwards}$ 310) to check for any ping messages received in that time period as well. In this regard, the listening window is in effect as indicated by reference 320, including both $\Delta t_{Forward}$ 312 and $\Delta t_{Backwards}$ 310. The use of buffered ping messages and an extended listening window helps avoid problems when Device A is faster at recognizing the cue and sends the device identity message before Device B's listening window is open (as illustrated in FIG. 3). The duration of $\Delta t_{Backwards}$ 310 may be sufficiently small so that device B has to store a limited number of recently received messages.

As seen in FIG. 3, device B will obtain the ping signal from device A as it is received within the "look back" window $\Delta t_{Backwards}$ 310 of the listening window 320. Additionally, to prevent the possibility of a third device ("device C"), configured similarly to A, sending a broadcasted device identity simultaneously (e.g., device C ping 314 is received at time t5), but having responded to a different cue, device A can encode information about the cue (e.g., fingerprint 146) in the broadcasted ping message 141. Device B can compare its own cue fingerprint with the received fingerprint from device A to verify they originated from the same cue signal 150. Pairing between devices A and B may then take place at 309 or time t6. In instances when device C sends a ping signal based on the same cue signal as device A, then further disambiguation may be performed (e.g., second level of disambiguation as described herein above). If device C is selected as a result of the disambiguation, then pairing between devices B and C takes place at time t6.

After the pairing is complete, the applications that require pairing can start. In instances when device A is a smart handheld device and device B is a projector, a wireless screen projection sessions may start so that content is wirelessly communicated from device A to device B for projection at device B. In accordance with one or more embodiments, the cue signal 150 may be indicative of a function/action that may be performed after the devices are paired. For example, if the cue signal is a voice command "Project my screen", then after the cue signal is processed (e.g., via speech recognition techniques) and matched against one or more of the pre-determined cue signals 108, . . . , 110, both devices A and B may determine that screen projection is the desired functionality, and the projection may automatically start after the devices are paired. As another example, the cue signal may be "Play my song list". In this instance, after devices are paired, a song list (e.g., pre-determined/stored at device A or stored at a network location, as part of a user profile) may be streamed from device A to device B (or from the network location to device A then to device B, or directly to device B from the network location). The specific function that is performed (automatically) after pairing may be specified as part of the pre-determined cue signals 108, . . . , 110 so that after a match is made with the received cue signal 150 and pairing is complete, the corresponding functionality may be initiated/performed.

FIG. 4 is an example timing diagram for a computing device receiving a cue signal and sending a cue, without initiating pairing with another device. For example, a cue signal 402 may be broadcast at time t0. At time t1, device A understands the cue signal and at time t2, device A sends a ping signal. However, device B may have been turned off or is otherwise unavailable, and no pairing may take place.

FIG. 5 is an example timing diagram for a computing device receiving a cue signal and opening a listening window, without initiating pairing with another device. Similarly to FIG. 4 where device B is unavailable, in this instance device A is unavailable. More specifically, after the cue signal 502 is broadcast at time t0, device B opens (at time t1) a listening window with $\Delta t_{Forward}$ 512 and $\Delta t_{Backwards}$ 510. However, as there is no device A that has received the cue signal, no ping signal is received in the time periods 510 and 512 and no pairing takes place.

Figure 6:
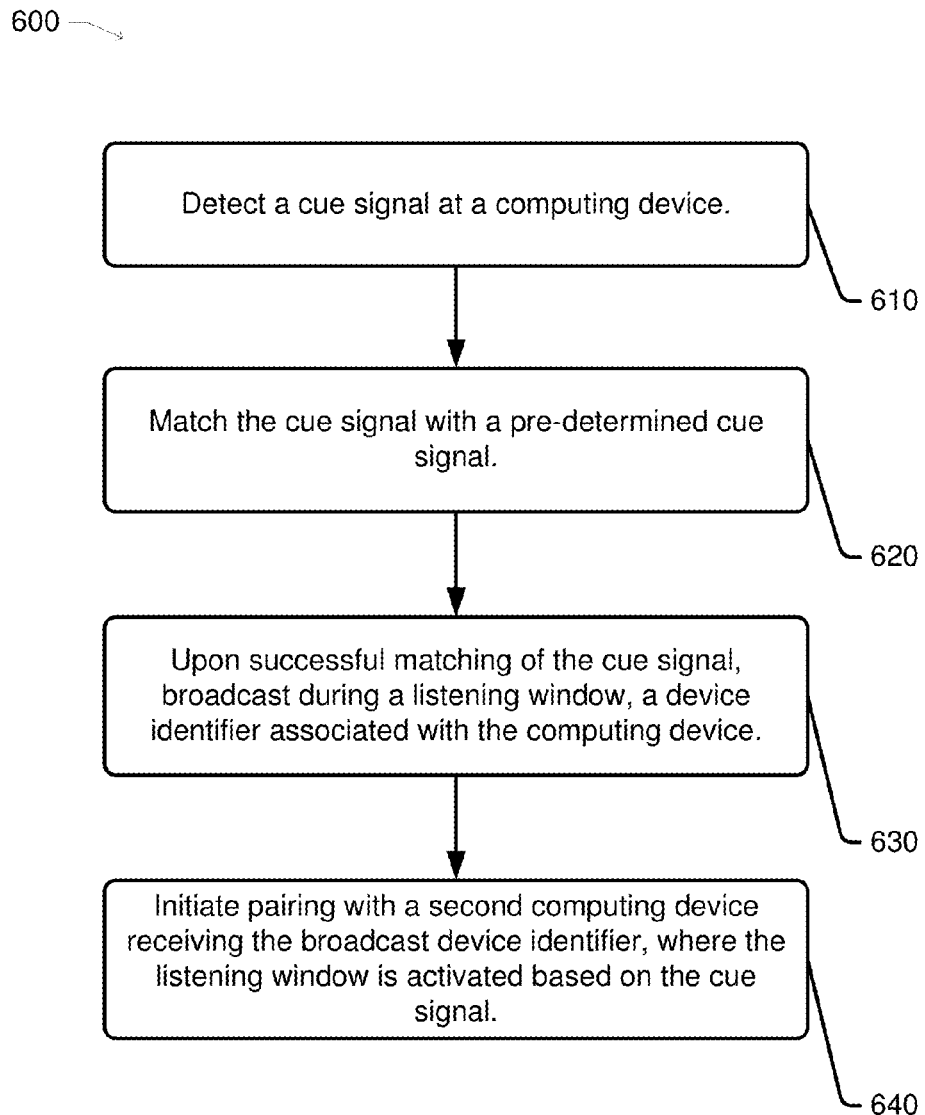
FIGS. 6-8 are flow diagrams illustrating example methods for pairing of devices using a cue signal, in accordance with one or more embodiments.
Figure 7:
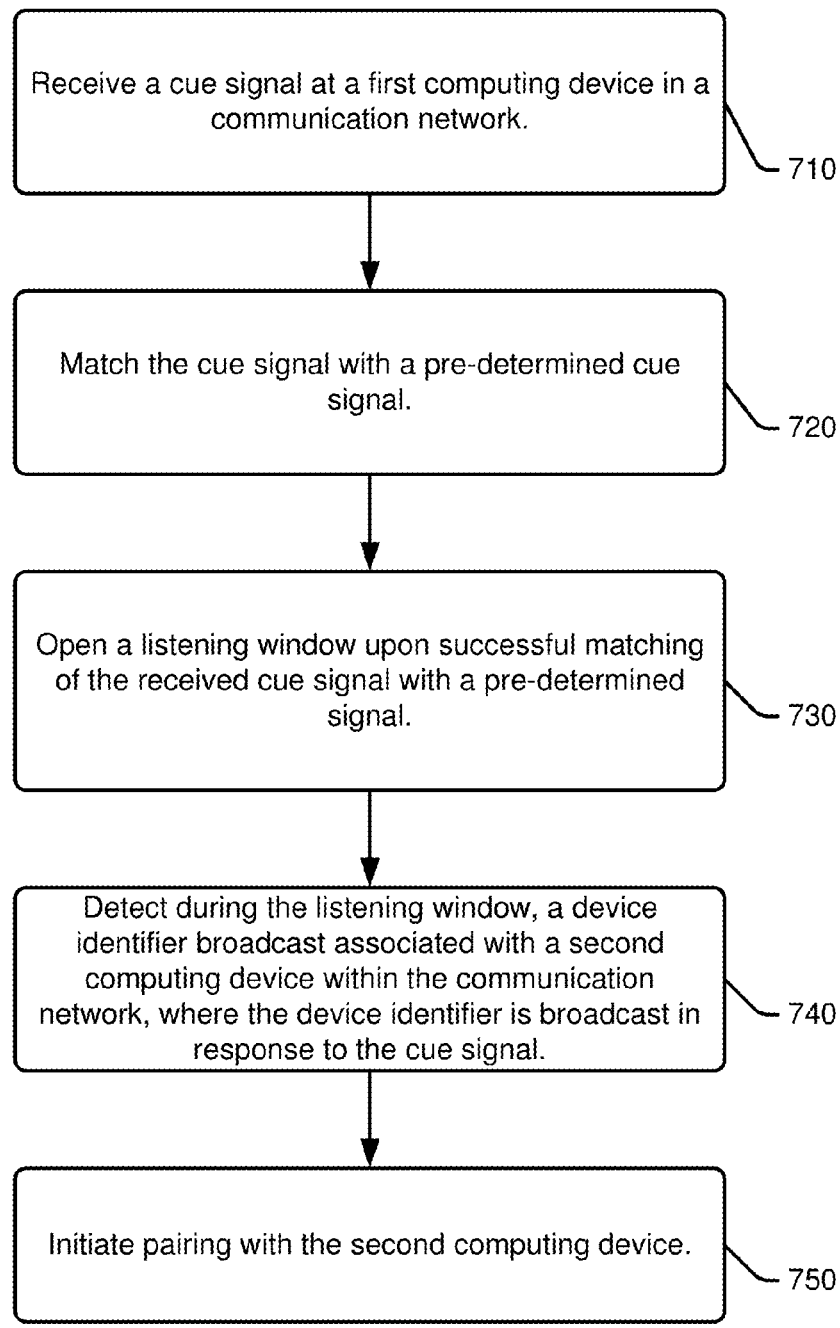
Figure 8:
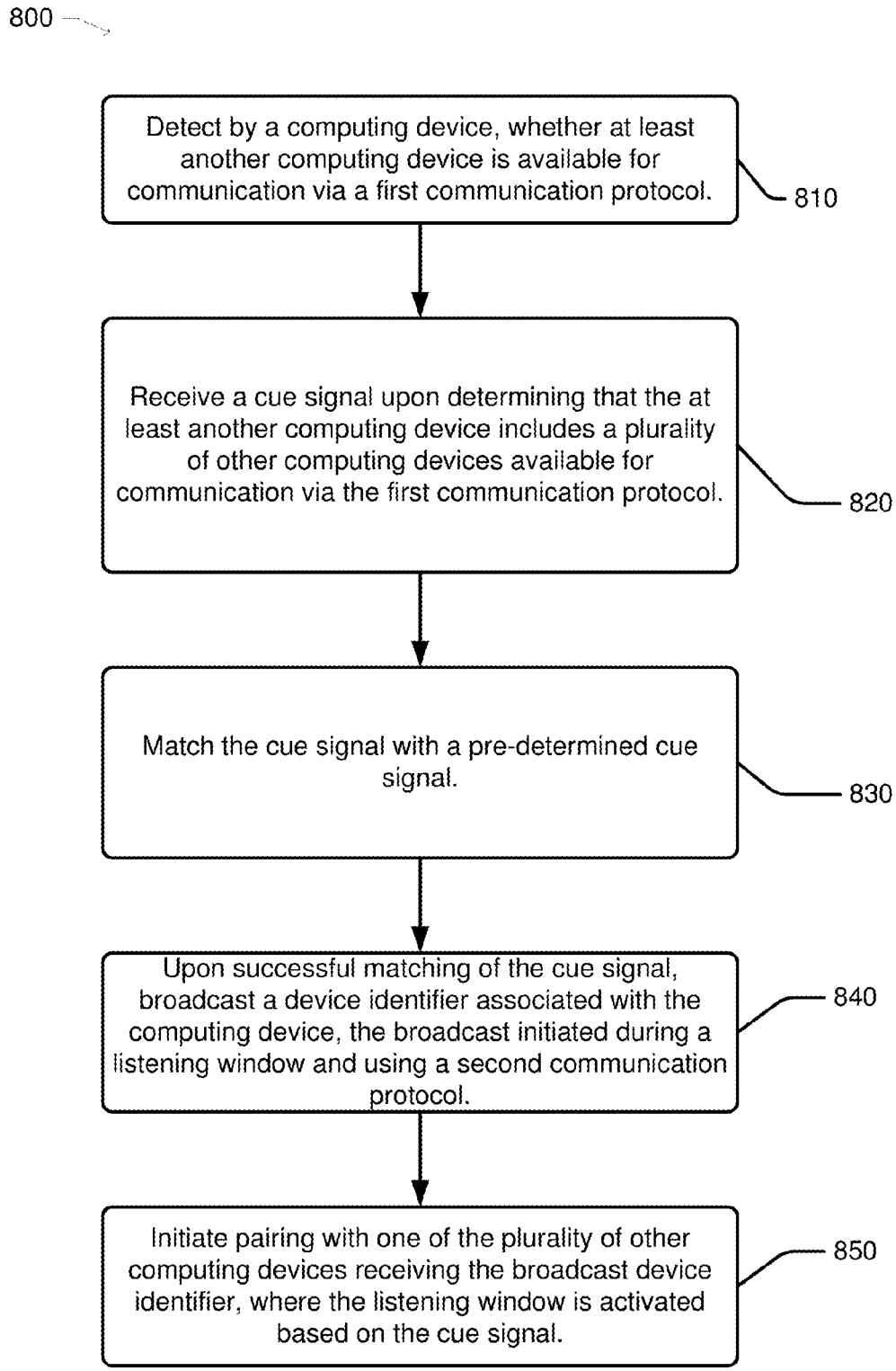

FIGS. 6-8 are flow diagrams illustrating example methods for creating and managing per-application profiles, in accordance with one or more embodiments. Referring to FIGS. 1-3 and 6, the example method 600 may start at 610, when device A may detect a cue signal 150. At 620, device A (e.g., the DPS 106a) may match the cue signal with a pre-determined cue signal (e.g., one or more of the pre-determined cue signals 108a). At 630, upon successful matching of the cue signal, a device identifier associated with the computing device is broadcast during a listening window. For example, after a match is made by device A, the device A ping signal 141 may be broadcast at time t3, during the listening window 220 (FIG. 2). At 640, pairing with a second computing device receiving the broadcast device identifier is initiated. For example, the listening window 220 is activated based on the cue signal (e.g., 202). Device B receives the ping signal (e.g., at time t3 or soon thereafter but prior to time t4), and pairing between devices A and B takes place at time t4.

Referring to FIGS. 1-3 and 7, the example method 700 may start at 710, when a cue signal (e.g., 150) is received by a first computing device (e.g., device B 104) in a communication network. At 720, the DPS 106b matches the cue signal with a pre-determined cue signal (e.g., one or more of the pre-determined cue signals 108b, 110b). At 730, a listening window is opened upon successful matching of the received cue signal with a pre-determined signal. For example, the device B 104 may open a listening window 220 after device B understand/matches the cue signal at time t2 (FIG. 2). At 740, a device identifier broadcast associated with a second computing device (e.g., device A) within the communication network is detected during the listening window (e.g., 220). For example, the device identifier (e.g., 142 within the ping signal 141) is broadcast (e.g., by device A) in response to the same cue signal 150. At 750, pairing with the second computing device is initiated (e.g., at time t4 in FIG. 2).

Referring to FIGS. 1-3 and 8, the example method 800 may start at 810, when device A may detect whether at least another computing device is available for communication via a first communication protocol. For example, device A may attempt to pair via a Bluetooth communication with neighboring devices. As part of the Bluetooth pairing process, a list of available devices may be displayed. At 820, the techniques described herein may be used to facilitate the Bluetooth pairing by disambiguating between available devices and initiating the device pairing automatically. For example, a cue signal 150 is communicated and device A may receive the cue signal. The cue signal may be communicated/broadcast upon determining that a plurality of other computing devices are available for communication via the first communication protocol (e.g., upon determining that there are multiple devices available for Bluetooth communication, then disambiguation may be performed using the techniques described herein).

At 830, device A may match the received cue signal (e.g., 150) with a pre-determined cue signal (e.g., one or more of the cue signals 108$a$, ..., 110$a$). At 840, upon successful matching of the cue signal, device A may broadcast a device identifier associated with the computing device (e.g., device A broadcasts a ping signal 141 with the device ID 142 and/or fingerprint 146 of the cue signal). The broadcast by device A may be initiated during a listening window (e.g., 220) and using a second communication protocol (communication between devices A and B may be performed using a protocol other than Bluetooth). At 850, pairing with one of the plurality of other computing devices receiving the broadcast device identifier takes place. For example, a listening window (220) may be activated based on the cue signal. The device A ping signal 141 is received by device B at time t3, and pairing between devices A and B takes place at time t3 (or prior to expiration of the listening window 220), where the pairing may be for purposes of using a Bluetooth communication link. In this regard, the techniques described herein may also be used to facilitate and perform automatic pairing using different protocols, when more than one device is available and there is a need for disambiguation between the available devices.

Figure 9:
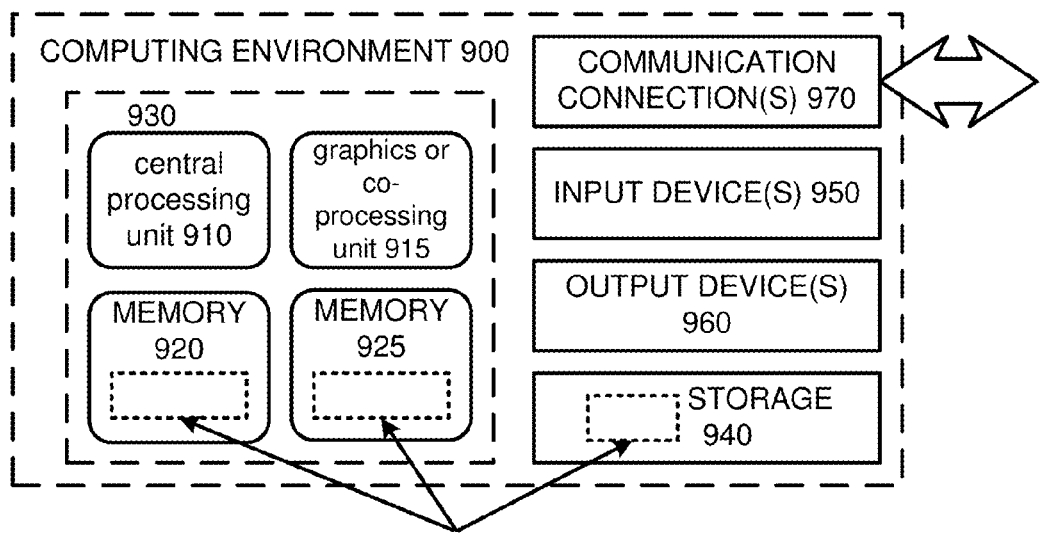
FIG. 9 is a diagram of an example computing system, in which some described embodiments can be implemented.

FIG. 9 is a diagram of an example computing system, in which some described embodiments can be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may also have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 10:
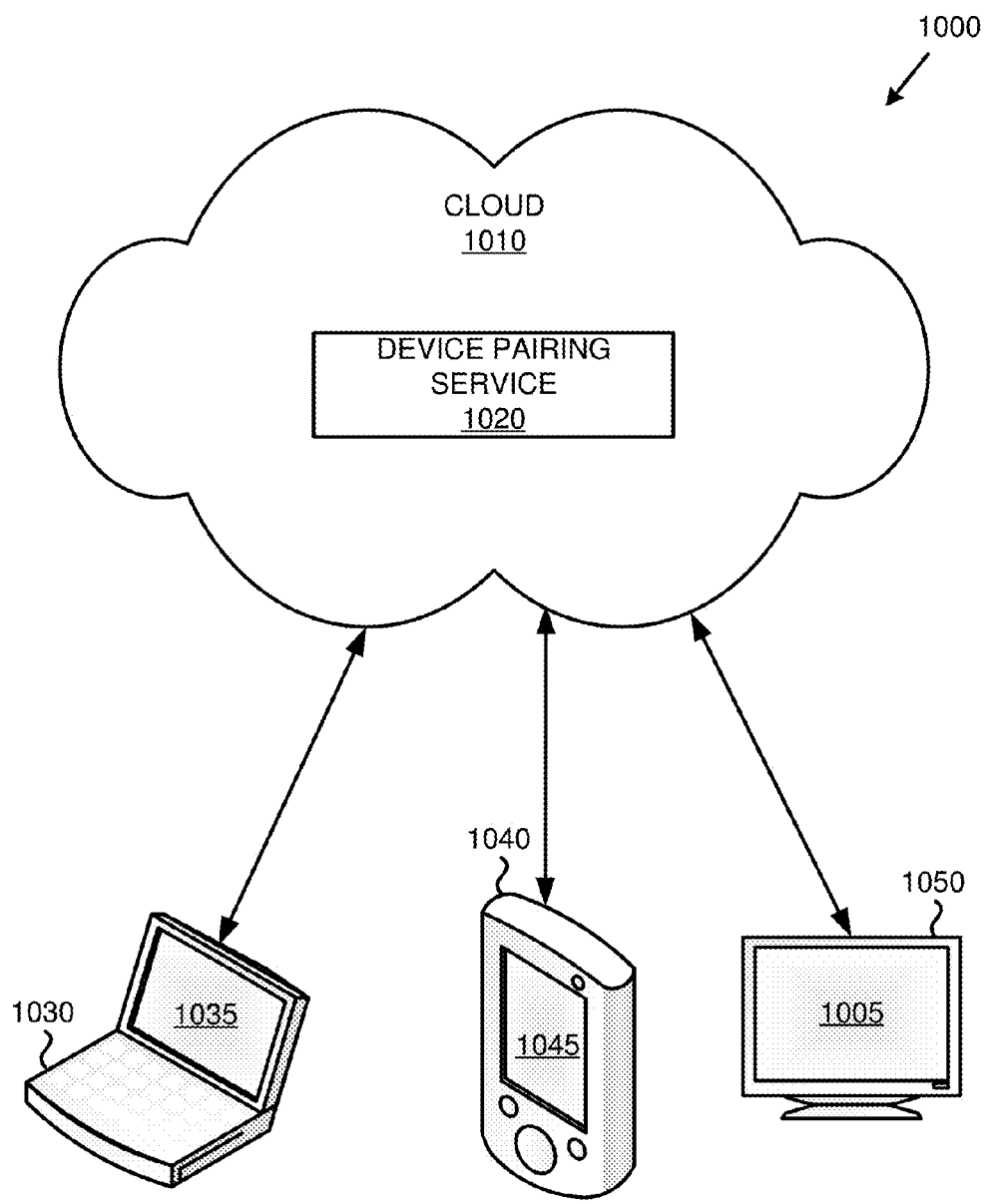
FIG. 10 illustrates a generalized example of a suitable cloud-supported environment, in which described embodiments, techniques, and technologies may be implemented.

FIG. 10 illustrates a generalized example of a suitable cloud-supported environment 1000, in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050), while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, and/or 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services related to pairing of nearby devices using a cue signal can be provided by the cloud 1010 through the device pairing service 1020. The service 1020 may have functionalities similar to the device pairing service 106 as described herein.

In the example environment 1000, the cloud 1010 provides one or more of the technologies and solutions described herein to the various connected devices 1030, 1040, and/or 1050 using, at least in part, the profile management service 1020.

Figure 11:
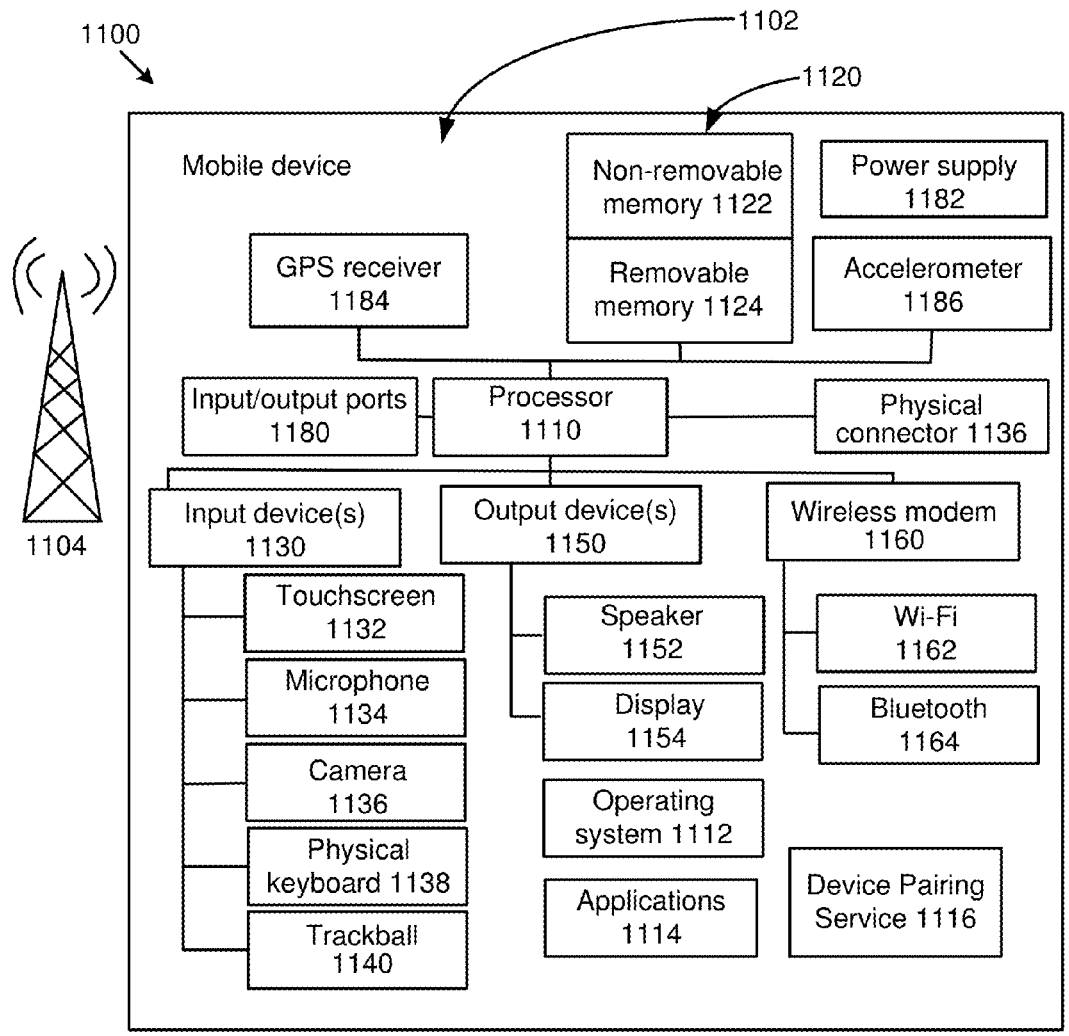
FIG. 11 is an example mobile device that can be used in conjunction with the technologies described herein.

FIG. 11 is an example mobile device that can be used in conjunction with the technologies described herein. Referring to FIG. 11, the example mobile device 1100 may include a variety of optional hardware and software components, shown generally at 1102. Any components 1102 in the mobile device 1100 can communicate with any other component, although not all connections are shown, for ease of illustration. The mobile device 1100 can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140, and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1194 (FireWire) port, and/or RS-232 port. The illustrated components 1102 are not required or all-inclusive, as any components can be deleted and other components can be added.

In an example embodiment of the disclosure, the mobile device 1100 may further include a device pairing service 1116, which may be separate from (e.g., a stand-alone application) or implemented as part of the operating system 1112, the applications 1114, and/or the device processor 1110. The device pairing service 1116 may have functionalities similar to the device pairing service 106, as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. By way of example and with reference to FIG. 11, computer-readable storage media may include memory and storage 1120, 1122, and 1124. The term "computer-readable storage media" does not include signals and carrier waves. In addition, the term "computer-readable storage media" does not include communication connections (e.g., 970, 1160, 1162, and 1164).

In accordance with one or more embodiments, a computing device may include a memory and a processor coupled to the memory. The processor is configured to detect a cue signal and match the cue signal with a pre-determined cue signal. Upon successful matching of the cue signal, a device identifier associated with the computing device is broadcast during a listening window. Pairing with a second computing device receiving the broadcast device identifier is initiated, where the listening window is activated based on the cue signal. The processor is further configured to receive the cue signal as a digitized voice input. The computing device further includes a digital personal assistant, the digital personal assistant configured to detect the digitized voice input. Upon successful pairing, transfer of data is initiated from the computing device to the second computing device. The data is selected based on metadata associated with the cue signal. The pre-determined cue signal is stored within the computing device. The processor is further configured to generate a hash based on the cue signal, and broadcast during the listening window, the device identifier with the hash. The pairing is based on the device identifier and the hash. The cue signal can be an audio signal and the hash is generated based on at least one of an audio fingerprint and/or length of the audio signal.

In accordance with one or more embodiments, a method for pairing devices in a communication network using a cue signal incudes, receiving a cue signal by a first computing device in a communication network. The cue signal is matched with a pre-determined cue signal. A listening window is open upon successful matching of the received cue signal with a pre-determined signal. A device identifier broadcast associated with a second computing device within the communication network is detecting during the listening window. The device identifier is broadcast in response to the cue signal. Pairing with the second computing device is initiated. The listening window is of a fixed duration and the method further includes detecting the device identifier prior to expiration of the fixed duration. The first computing device may determine whether at least another device identifier is broadcast during the listening window, the at least another device identifier associated with a third computing device. The pairing with the second computing device is initiated upon determining that the at least another device identifier is not broadcast during the listening window. Upon determining that the at least another device identifier is broadcast during the listening window, one of the second computing device or the third computing device is selected, the selecting based on metadata associated with the cue signal. A hash of the cue signal is received from the second computing device and the third computing device. The hash from the second computing device and the hash from the third computing device are compared with the metadata. The selecting of the second computing device or the third computing device is based on the comparing. Pairing between the computing device and the selected one of the second computing device or the third computing device is initiated. The first computing device is a projector, and upon successful pairing with the second computing device, data is received from the second computing device. The received data is projected on a display. One or more device identifiers received prior to opening the listening window can be buffered. Upon determining that the device identifier broadcast associated with the second computing device is unavailable during the listening window, one of the one or more device identifiers received prior to opening the listening window can be selected. The selecting is based on metadata associated with the cue signal.

A computer-readable storage medium stores computer-executable instructions for causing a computing device to perform a method for pairing devices in a communication network using a cue signal. The stored instructions include instructions to detect whether at least another computing device is available for communication via a first communication protocol; instructions to receive a cue signal upon determining that the at least another computing device comprises a plurality of other computing devices available for communication via the first communication protocol; instructions to match the cue signal with a pre-determined cue signal; instructions to, upon successful matching of the cue signal, broadcast a device identifier associated with the computing device, the broadcast initiated during a listening window and using a second communication protocol; and instructions to initiate pairing with one of the plurality of other computing devices receiving the broadcast device identifier, wherein the listening window is activated based on the cue signal. The cue signal includes a digitized voice input received at the computing device, and the stored instructions further include instructions to generate a fingerprint signal of the received digitized voice input. The stored instructions further include instructions to broadcast the fingerprint signal together with the device identifier, wherein initiating the pairing with the one of the plurality of other devices is based on the device identifier and the fingerprint.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing device, comprising:
    a memory; and
    a processor coupled to the memory, the processor configured to:
        detect a cue signal;
        match the cue signal with a pre-determined cue signal;
        upon successful matching of the cue signal, broadcast via a computer network, a device identifier associated with the computing device; and
        initiate pairing with a second computing device receiving the broadcast device identifier, wherein the second computing device opens a listening window, and the listening window is activated, upon successful matching of the cue signal by the second computing device;
    wherein the second computing device opens the listening window for a forward period of time beginning from a time when the second computing device matches the cue signal, and wherein the second computing device stores recently received broadcast identifiers, received via the computer network, for a backward period of time, before the listening window is opened, from the time when the second computing device matches the cue signal, and wherein the stored broadcast identifiers are usable by the second computing device for initiating the pairing.

2. The computing device according to claim 1, wherein the processor is further configured to:
    receive the cue signal as a digitized voice input.

3. The computing device according to claim 2, wherein the computing device further comprises a digital personal assistant, the digital personal assistant configured to detect the digitized voice input.

4. The computing device according to claim 1, wherein the processor is further configured to:
    upon successful pairing, initiate transfer of data from the computing device to the second computing device.

5. The computing device according to claim 4, wherein the processor is further configured to:
    select the data based on metadata associated with the cue signal.

6. The computing device according to claim 1, wherein the pre-determined cue signal is stored within the computing device.

7. The computing device according to claim 1, wherein the processor is further configured to:
    generate a hash based on the cue signal; and
    broadcast during the listening window, the device identifier with the hash, wherein the pairing is based on the device identifier and the hash.

8. The computing device according to claim 7, wherein the cue signal is an audio signal and the hash is generated based on at least one of an audio fingerprint and/or length of the audio signal.

9. A method, performed by a computing device, for pairing devices using a cue signal, the method comprising:
    detecting a cue signal;
    matching the cue signal with a pre-determined cue signal;
    upon successful matching of the cue signal, broadcasting via a computer network, a device identifier associated with the computing device; and
    initiating pairing with a second computing device receiving the broadcast device identifier, wherein the second computing device opens a listening window, and the listening window is activated, upon successful matching of the cue signal by the second computing device; wherein the second computing device opens the listening window for a forward period of time beginning from a time when the second computing device matches the cue signal, and wherein the second computing device stores recently received broadcast identifiers, received via the computer network, for a backward period of time, before the listening window is opened, from the time when the second computing device matches the cue signal, and wherein the stored broadcast identifiers are usable by the second computing device for initiating the pairing.

10. The method of claim 9, further comprising:
receiving the cue signal as a digitized voice input.

11. The method of claim 10, wherein the computing device comprises a digital personal assistant, the digital personal assistant configured to detect the digitized voice input.

12. The method of claim 9, further comprising:
upon successful pairing, initiating transfer of data from the computing device to the second computing device.

13. The method of claim 12, further comprising:
selecting the data based on metadata associated with the cue signal.

14. The method of claim 9, wherein the pre-determined cue signal is stored within the computing device.

15. The method of claim 9, further comprising:
generating a hash based on the cue signal; and
broadcasting during the listening window, the device identifier with the hash, wherein the pairing is based on the device identifier and the hash.

16. The method of claim 15, wherein the cue signal is an audio signal and the hash is generated based on at least one of an audio fingerprint and/or length of the audio signal.

17. A computing device, comprising:
a memory; and
a processor coupled to the memory, the processor configured to:
detect a cue signal;
match the cue signal with a pre-determined cue signal;
upon successful matching of the cue signal, open a listening window, wherein the listening window is activated based on the successful matching of the cue signal by the computing device;
detect a device identifier broadcast by a second computing device via a computer network, wherein the device identifier is broadcast by the second computing device in response to the cue signal; and
initiate pairing with the second computing device;
wherein the computing device opens the listening window for a forward period of time beginning from a time when the computing device matches the cue signal, and wherein the computing device stores recently received broadcast identifiers, received via the computer network, for a backward period of time, before the listening window is opened, from the time when the computing device matches the cue signal, and wherein the stored broadcast identifiers are usable by the computing device for initiating the pairing.

18. The computing device according to claim 17, wherein the computing device further comprises a digital personal assistant, the digital personal assistant configured to receive the cue signal as a digitized voice input.

19. The computing device according to claim 17, wherein the processor is further configured to:
upon successful pairing, receiving a transfer of data from the second computing device.

20. The computing device according to claim 17, wherein the pre-determined cue signal is stored within the computing device.

* * * * *